United States Patent [19]

Hush

[11] Patent Number: 5,663,742
[45] Date of Patent: Sep. 2, 1997

[54] COMPRESSED FIELD EMISSION DISPLAY

[75] Inventor: Glen E. Hush, Boise, Id.

[73] Assignee: Micron Display Technology, Inc., Boise, Id.

[21] Appl. No.: 517,244

[22] Filed: Aug. 21, 1995

[51] Int. Cl.⁶ .................................................. H04N 5/66
[52] U.S. Cl. ................................................ 345/74; 345/127
[58] Field of Search ................................ 345/55, 50, 33, 345/89, 74, 127

[56] References Cited

U.S. PATENT DOCUMENTS

| | | | |
|---|---|---|---|
| 3,500,102 | 3/1970 | Crost et al. | 313/109 |
| 3,793,628 | 2/1974 | Gaur | 345/55 |
| 4,542,527 | 9/1985 | Tsunekawa | 345/55 |
| 4,890,101 | 12/1989 | Carlson | 345/55 |
| 4,922,240 | 5/1990 | Duwaer | 345/55 |
| 4,940,916 | 7/1990 | Borel et al. | 313/306 |
| 5,129,850 | 7/1992 | Kane et al. | 445/24 |
| 5,212,426 | 5/1993 | Kane | 315/169.1 |
| 5,359,256 | 10/1994 | Gray | 313/169 |

OTHER PUBLICATIONS

Cathey, David A. Jr., "Field Emission Displays," Micron Display Technology, Inc., Boise, Idaho, undated.

Lee, Kon Jiun, "Current Limiting of Field Emitter Array Cathodes," Excerpt of Thesis, Georgia Institute of Technology, Aug. 1986.

Yokoo, K. et al., "Active Control of Emission Current of Field Emitter Array, Revue Le Vide, les Couches Minces," vol. 271, Mar./Apr. 1994, pp. 58–61.

Primary Examiner—Mark R. Powell
Attorney, Agent, or Firm—Seed and Berry LLP

[57] ABSTRACT

A reduced size field emission display eliminates selected horizontal lines to reduce the size of an array of emitter sets. In one embodiment, every Nth output of a row pointer is left disconnected such that for every Nth line of image, no row of the array is activated. The overall number of rows of the array can be reduced by the number of unconnected outputs of the row pointer. In another approach, every Nth pulse of a row clock is blocked by a clock dropping circuit. Because the row pointer does not receive the Nth pulse, the row pointer remains at a current row for the two scans of the column data. The (N−1)th row is thus overwritten.

15 Claims, 4 Drawing Sheets

COMPRESSED FIELD EMISSION DISPLAY

This invention was made with Government support under contract No. DABT63-93-C-0025, awarded by Advanced Research Projects Agency (ARPA). The Government has certain rights in this invention.

TECHNICAL FIELD

The present invention relates to field emission displays having a compressed viewable display.

BACKGROUND OF THE INVENTION

Small flat panel displays are widely used in a variety of applications, including view finders for camcorders and viewing screens for head-mounted displays. One type of device suited for such small displays is the field emission display.

Field emission displays typically include a generally planar emitter beneath a display screen. The emitter is a substrate having an array of surface discontinuities projecting from an upper surface. In many cases, the surface discontinuities are conical projections, or "emitters" integral to the substrate. Typically, the emitters are grouped into emitter sets where the bases of the emitters in the emitter sets are commonly connected. A conductive grid is positioned above the emitters and driven with a voltage of about 30 V–120 V. The emitter sets are then selectively activated by a current path between the bases and ground to produce an electric field extending from the grid to the emitters. In response to the electric field, the emitter sets emit electrons according to the Fowler-Nordheim equation.

The display screen is mounted directly above the grid, and it is coated with a transparent conductive material to form an anode biased to about 1–2 kV. The anode attracts the emitted electrons, causing the electrons to pass through the grid. A cathodoluminescent layer covers the anode to intercept the electrons as they travel toward the 1–2 kV potential of the anode. The electrons strike the cathodoluminescent layer causing the cathodoluminescent layer to emit light at the impact point. The emitted light then passes through the anode and display screen where it is visible to a viewer.

The brightness of the light produced in response to the emitted electrons depends, in part, upon the amount of electrons striking the cathodoluminescent layer in each frame, which in turn depends upon the amount of current available to provide electrons to the emitter sets. The brightness of each area can thus be controlled by controlling the current flow to the respective emitter set. By selectively controlling the current flow to the emitter sets, the light from each area of the display can be controlled and an image can be produced. The light emitted from each of the areas thus becomes all or part of a picture element or "pixel."

In many applications, the size of the field emission display can have significant effects on the cost, reliability, weight, and manufacturability. Generally, the smaller the display, the lower its cost and weight will be. Also, smaller displays typically have higher reliability and higher manufacturing yields. However, the size of the display can be limited by the size and number of pixels in the array. For example, for a conventional array having 240 rows of pixels, the minimum vertical screen dimension is 240 times the minimum height of the pixels.

One way to reduce the minimum vertical dimension of the display is to eliminate the uppermost ten lines and lowermost ten lines of the display. The elimination of these 20 lines "chops" the top and bottom of the image, causing a noticeable loss of picture quality.

SUMMARY OF THE INVENTION

A synchronously driven field emission display includes an array of pixels arranged in rows and columns. Each pixel includes an emitter set having at least one emitter. The pixels are activated by synchronous column and row signals in response to a driving signal and a clock signal.

A column driver provides the column signal under control of a column clock signal and an image signal. The column driver includes a column register receiving the column clock signal and a driver bank. The column register sequentially activates individual ones of the drivers in the driver bank. Simultaneously, an image signal is applied to the drivers in the driver bank. In response to the sequential activation and the image signal, the drivers in the driver bank provide image samples to individual columns of the array.

The rows of the array are driven by a row pointer under control of a row clock. The row clock generates a row clock signal at a frequency much lower than the column clock signal. At each pulse of the row clock signal, a "1" is walked through successive shift cells within the row register to activate a subsequent row of the array. While the "1" is in each shift cell, the sequentially activated drivers in the driver bank activate every column in the array, such that each pixel in the row is driven by an image sample.

To reduce the number of rows, every nth shift cell of the row register is left disconnected. Consequently, at each nth pulse of the row clock, no row of the array is activated. The number of rows in the array can thus be reduced by the number of disconnected shift cells in the row register.

In an alternative embodiment of the invention, all of the shift cells in the row register are connected to rows of the array; however, a clock dropping circuit eliminates every nth pulse of the row clock. Consequently, the row register overwrites every pulse preceding the nth row clock pulse. The number of shift cells in the row register can therefore be reduced and the number of rows in the array can be reduced accordingly.

DETAILED DESCRIPTION OF THE INVENTION

Figure 1:
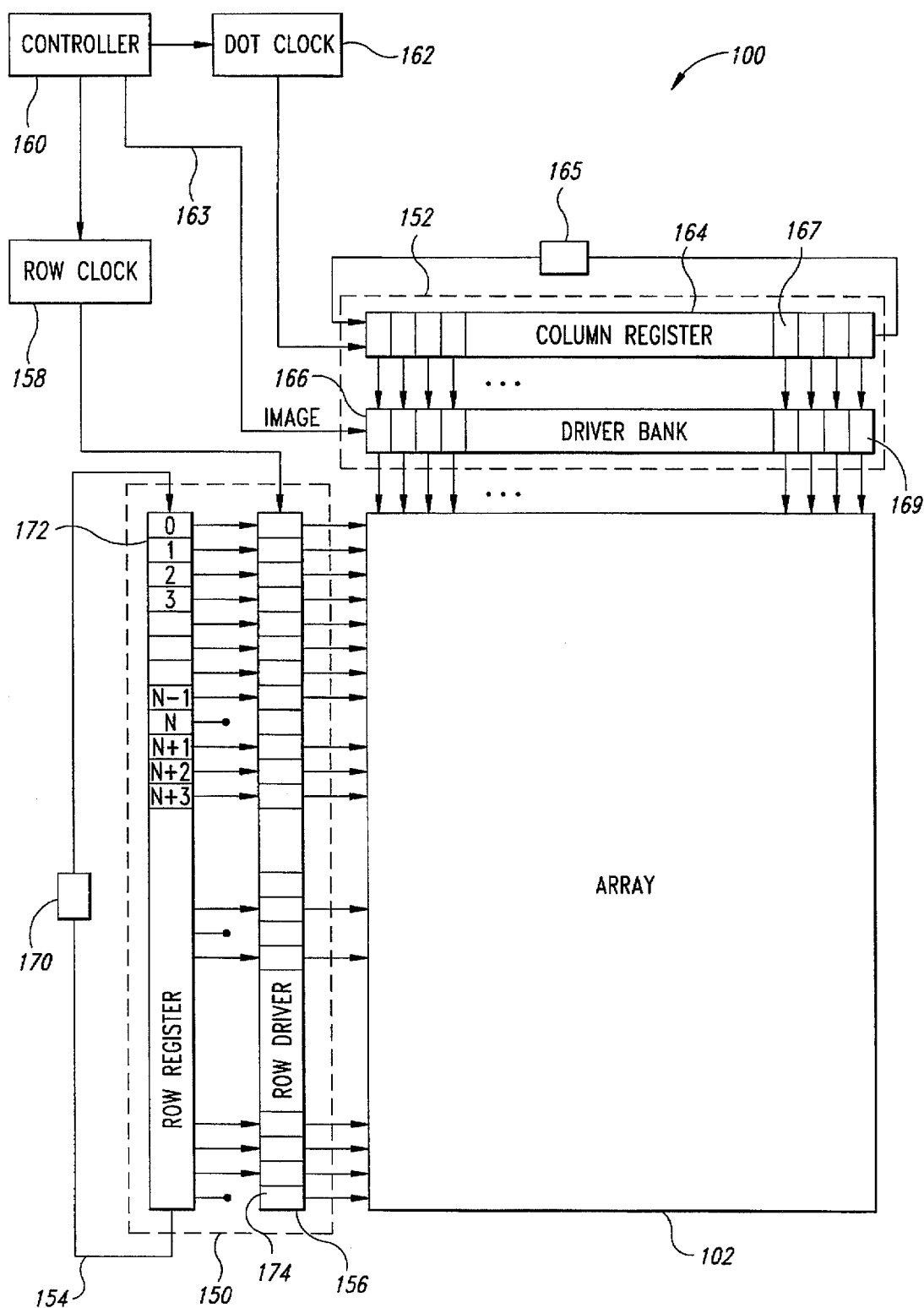
FIG. 1 is a block diagram of a preferred embodiment of a field emission display according to the invention.

As shown in FIG. 1, a field emission display 100 includes as its central display element a field emissive array 102 having emissive areas arranged in rows and columns. The array 102 may be any known field emissive array having selectively drivable rows and columns. As will be discussed below, the rows are driven by a row pointer 150 under control of a controller 160 through a row clock 158, and the columns are driven by a column pointer 152 also under control of the controller 160 through a dot clock 162 and an image line 163.

Figure 2:
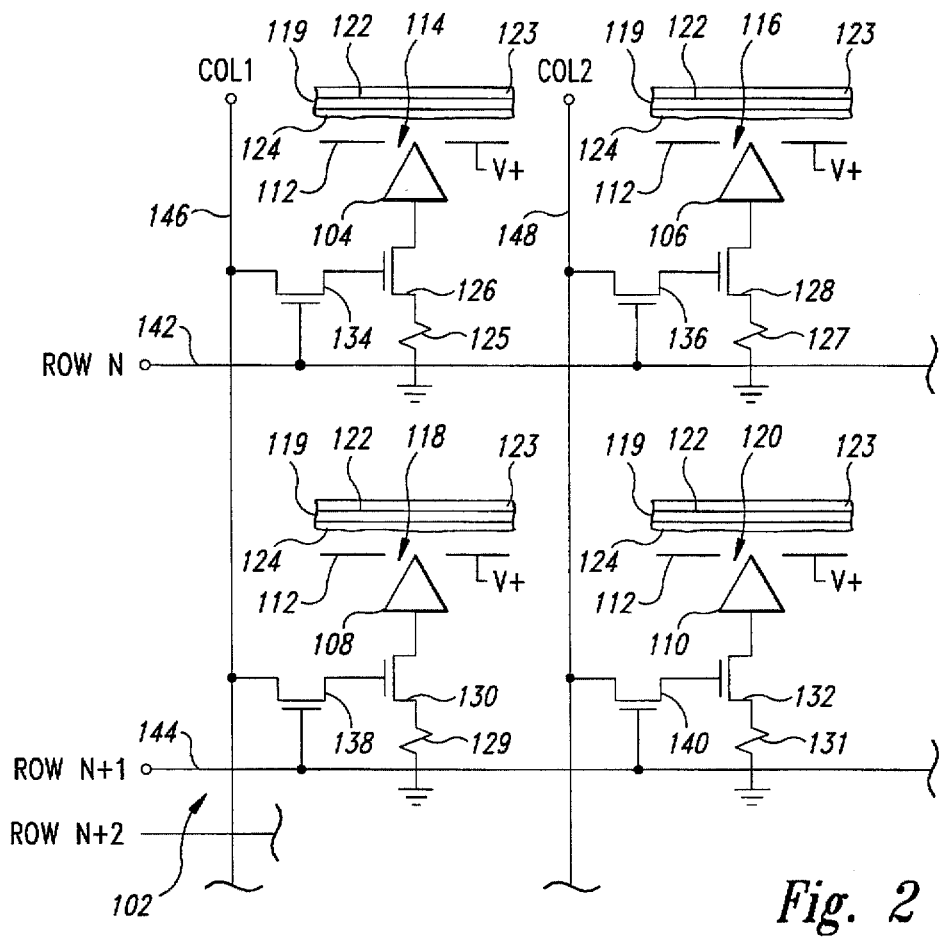
FIG. 2 is a schematic diagram of a portion of the field emission display of FIG. 1 showing selected emitters and their respective driving circuits.

A section of the array 102 is shown in greater detail in FIG. 2. In the array 102, four emitter sets 104, 106, 108, 110 form portions of two separate rows and columns with each emitter set corresponding to one pixel of the display. While only four emitter sets 104, 106, 108, 110 are presented in FIG. 2, the number of emitter sets in the entire array 102 is much greater. For example, a 240 by 550 array would include 132,000 emitter sets. Also, while each emitter set 104, 106, 108, 110 is schematically represented by a single emitter, it will be understood by one of skill in the art that each of the emitter sets 104, 106, 108, 110 may include one or more emitters depending on the particular design of the array 102.

A grid 112 overlies the emitter sets 104, 106, 108, 110 with each emitter set aligned to a corresponding hole 114, 116, 118, 120 in the grid 112. In operation, the grid 112 is raised to a driving voltage V+, typically in the range of 30-120 V. If one of the emitter sets 104, 106, 108, 110 is grounded, or connected to a low voltage relative to the grid 112, an intense electric field is produced between the grid 112 and the emitter set 104, 106, 108, or 110. At a sufficiently high electric field strength, the emitter set 104, 106, 108, or 110 will emit the electrons according to the Fowler-Nordheim equation, as is explained in greater detail in U.S. Pat. No. 4,940,916, which is incorporated herein by reference.

A display screen 119 formed from a layer of transparent conductive coating on a glass plate 123 forms an anode 122 positioned above the grid 112. The anode 122 is connected to high voltage, typically 1-2 kV, and attracts the emitted electrons. As the electrons travel toward the anode 122 they strike a cathodoluminescent layer 124 on the lower surface of the anode 122. The energy of the electrons causes the cathodoluminescent layer 124 to emit light. The emitted light passes through the anode 122 and the glass plate 119 where it is visible to an observer.

It will be understood by one of skill in the art that, in color displays, the cathodoluminescent layer 124 includes, for each emitter set 104, 106, 108, 110, three small areas. Each of the three areas contains a different material composition, where the three compositions produce red, green and blue light, respectively. Each emitter set 104, 106, 108, 110 is also segmented into three groups of emitters, where each group of emitters is aligned to either the red, green, or blue emissive area of the cathodoluminescent layer 124. Combinations of the red, green, and/or blue areas can then be activated according to conventional techniques to produce a variety of colors. Each emitter set 104, 106, 108, 110 then corresponds to a color pixel.

If the emitter set 104, 106, 108, or 110 is electrically isolated from ground, electrons are unable to reach the emitter set to be emitted. Therefore, when the emitter set 104, 106, 108, or 110 is isolated from ground, no light is emitted. If a small amount of current is permitted to flow to the emitter set 104, 106, 108 or 110, a small amount of light will be emitted. As the amount of current is increased, the emitted light increases accordingly.

In the array 102 of FIG. 2, current flow from ground to each emitter set 104, 106, 108, or 110 is selectively controlled by a corresponding drive transistor 126, 128, 130, 132 and select transistor 134, 136, 138, 140. Such drive and select transistors can be integrated into a common substrate with the emitters 104, 106, 108, 110 to form a compact integrated structure. The drive transistors 126, 128, 130 or 132 are operated as analog devices with their drains connected to the emitter sets 104, 106, 108, 110 and their sources coupled to ground through respective limiting resistors 125, 127, 129, 131. When the drive transistor 126, 128, 130 or 132 is "OFF" it isolates its respective emitter set 104, 106, 108 or 110 from ground. When the gate of drive transistor 126, 128, 130 or 132 is raised above the threshold voltage, the drive transistor forms a conductive path from the emitter set 104, 106, 108, or 110 through the respective limit resistor 125, 127, 129, 131 to ground, with the amount of current flow depending upon the gate voltage and the value of the limit resistors.

The gate of each drive transistor 126, 128, 130, 132 is coupled to one of two column lines 146, 148 through a respective select transistor 134, 136, 138, 140. The select transistors 134, 136, 138, 140 are operated as switches to connect or isolate the gates of their respective drive transistors 126, 128, 130, 132 to or from the corresponding column line 146 or 148.

The upper left select transistor 134 and the lower left select transistor 138 couple the upper left drive transistor 126 and lower left drive transistor 130 to a column 1 line 146. The upper right select transistor 136 and lower right select transistor 140 couple the upper right drive transistor 128 and lower right drive transistor 132 to column 2 line 148. The gates of the two upper select transistors 134, 136 are driven by a row N line 142 and the gates of the two lower select transistors 138, 140 are driven by a row N+1 line 144. When a sufficient drive voltage is applied to the row N line 142, the upper left and right drive transistors 126, 128 are connected to their respective column lines 146, 148, such that the column 1 line 146 can control current flow to the upper left emitter set 104 and the column 2 line 148 can control current flow to the upper right emitter set 106. Similarly, the lower left and right drive transistors 130, 132 will be connected to their respective column lines 146, 148 when a sufficient drive voltage is applied to the row N+1 line 144. Then, the column 1 line 146 can control current flow to the lower left emitter set 108 and the column 2 line 148 can control the current flow to the lower right emitter set 110.

An electrical image signal applied to one of the column lines 146 or 148 will therefore drive the gate of a drive transistor 126, 128, 130, 132 only if the corresponding select transistor 134, 136, 138 or 140 is mined "ON" by the corresponding row line 142 or 144. In response to the image signal, the drive transistor 126, 128, 130, 132 conducts current to activate the corresponding emitter set 104, 106, 108, 110. Consequently, the emitter sets 104, 106, 108, 110 can be selectively controlled by applying an "ON" drive voltage to one of the row lines 142, 144 and applying the image signal to one of the column lines 146, 148.

Returning to FIG. 1, the drive voltage on the row lines 142, 144 and the image signal on the column lines 146, 148 are supplied by the row pointer 150 and column driver 152, respectively under control of the controller 160. The operation of the column driver 152 will be described first.

The controller 160 controls the selection of which columns to active through a dot clock 162 that is coupled to a column register 164 within the column driver 152. The dot clock 162 generates a column clock signal at a column clock frequency $f_C$ clock data quickly through shift cells 167 of the column register 164. A column initialization circuit 165 ensures that the only one shift cell 167 of the column register 164 holds a "1." Thus, the column clock signal "walks" a single "1" through successive shift cells 167 within the column register 164. The column register 164 therefore outputs only a single "1" that sequentially moves from left to right until the "1" reaches the rightmost shift cell 167 of the column register 164. The next clock pulse forwards the "1" to the column initialization circuit 165. The initialization circuit 165 returns the "1" to the leftmost shift cell 167 of the column register 164 where it once again is walked from left to right.

As the "1" moves from left to right through the column register 164, the outputs of the respective shift cells 167 sequentially activate column line drivers 166 in a driver bank 169. The column line drivers 166 are conventional column line drivers, each coupled to an individual column line. Because only a single output of the column register 164 is a "1," only a single column line driver 166 is active at any time.

An analog image signal from the controller 160 provides a second input to the driver bank 169 through the image line 163. The image signal is represented in the uppermost diagram of FIG. 3. At each pulse of the column clock signal, whichever column line driver 166 (FIG. 1) is active outputs an image sample corresponding to the image signal. The image samples output from the column drivers 166 (FIG. 1) thus form a sequence of samples of the analog image signal, as indicated by the arrows 168. Each image sample then drives the respective column line, such as the column 1 line 146 or column 2 line 148 (FIG. 2). It will be understood by one of skill in the art that each successive arrow 168 represents the magnitude of an analog signal sample output from the currently active column line driver 166. It will also be understood that, in a color display, each arrow 168 would represent three samples of the image signal including red, green and blue information respectively. The three samples would then be directed to respective red, green and blue column lines for each pixel.

Returning again to FIG. 1, the controller 160 controls activation of row lines, and thus the select transistors (FIG. 2), through a row clock 158 and a row pointer 150. The row pointer 150 includes a row register 154 driven by a row clock signal from the row clock 158, and a row driver bank 156 driven by the row register 154. To ensure that the row pointer 150 produces a single "1," a row initialization circuit 170 is connected to the row pointer 150. In a similar fashion to the column register 164, the row register 154 outputs a single "1" from each successive shift cell 172. As the "1" moves in turn through the shift cells 172, the respective shift cells 172 sequentially activate corresponding row drivers 174.

The row clock frequency $f_R$ is much lower than the column clock frequency $f_C$. For example, for a display having 550 columns, the row clock 158 would output one pulse for every 550 pulses from the dot clock 162. Thus, in the column register 164, the "1" moves through every shift cell 167 before the "1" in the row register 154 moves to a new shift cell 172. A relative timing of the row and column clock signals is visible in FIG. 3.

Figure 4:
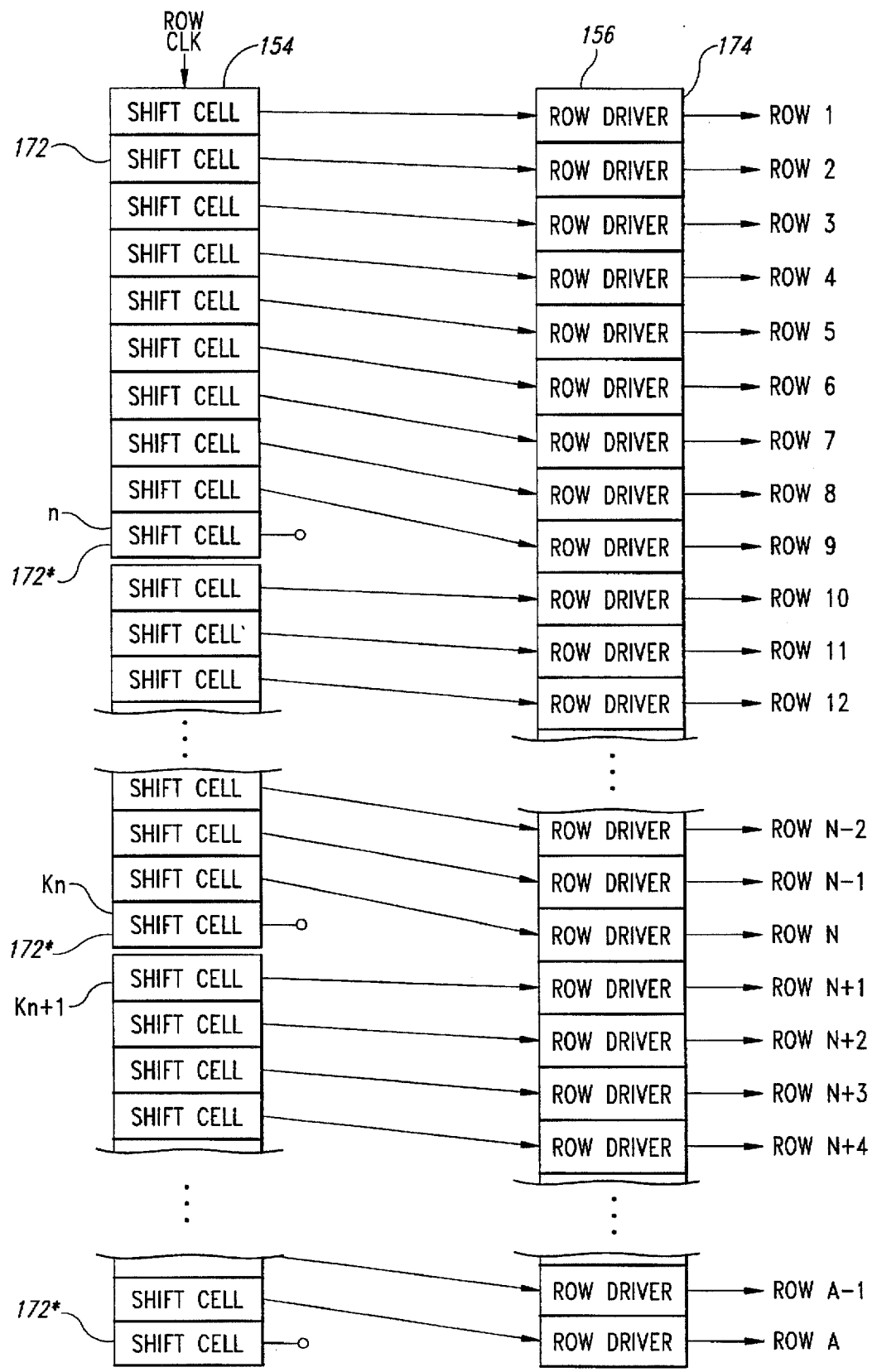
FIG. 4 is a schematic diagram of a row pointer within the field emission display of FIG. 1.

FIG. 4 shows the coupling of the row register 154 to the row driver bank 156. Unlike a conventional pointer approach, the output of every nth shift cell 172* in the row register 154 is left disconnected. In the preferred embodiment, n is equal to ten. At every pulse of the row clock signal the "1" will then be shifted to a "dummy" shift cell 172* having a disconnected output. Until the next pulse of the row clock signal arrives, no row driver 174 will be activated. Thus, while the "1" is in the dummy shift cell 172*, no select transistors (FIG. 2) will be "ON" and no pixels will be active.

Figure 3:
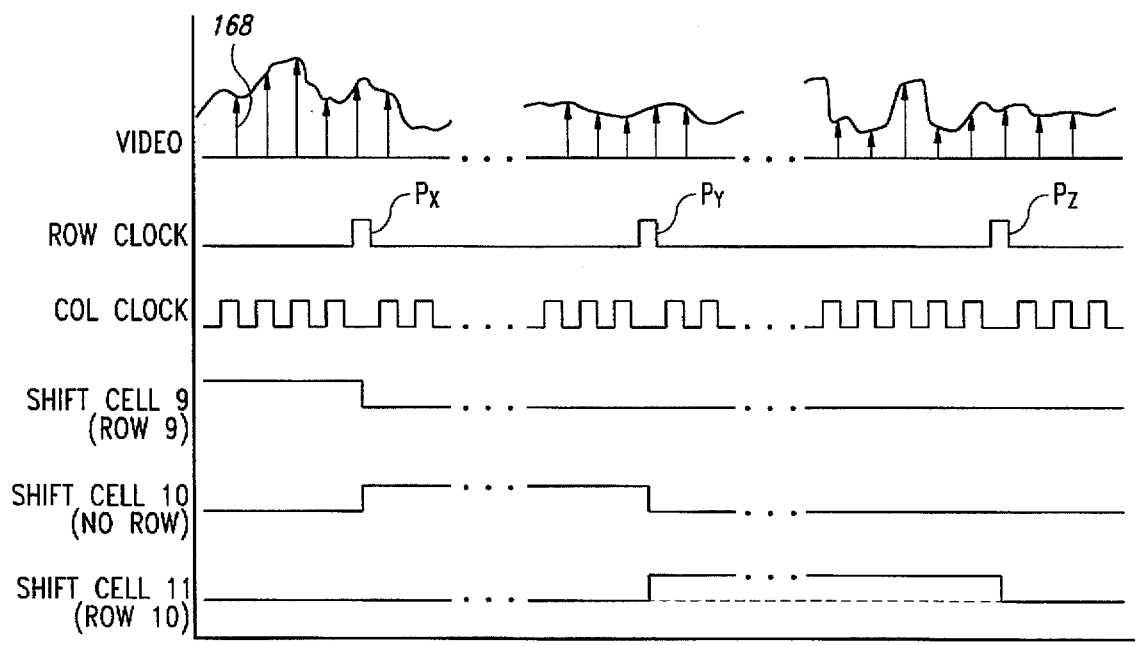
FIG. 3 is a series of series of signal timing diagrams showing signals within the portion of the field omission display of FIG. 2.

An example of the outputs from the shift cells 172 is shown in the lower four timing diagrams of FIG. 3. Prior to a first pulse $P_x$, the ninth shift cell 172 immediately is activated and outputs a "1." The corresponding row driver 174 is thus active and all of the select transistors in the ninth row are thus "ON," coupling their respective drive transistors (not shown) to their corresponding column lines.

While the ninth shift cell 172 is a "1," several pulses of the column clock signal arrive. At each pulse of the column clock signal, the image samples from successive ones of the column line drivers 166 (FIG. 1) are samples of the image signal corresponding to the amplitude of the image signal. The column lines thus synchronously receive the image samples that correspond to the amplitude of the image signal. Assuming the ninth row driver 174 is connected to the row N line 142 (FIG. 2), the respective drive transistors 126, 128 sequentially drive the emitter sets 104, 106 in the row N line 142. The image samples thus drive each of the pixels along the row N line 142 in sequence to produce a "line" of image. When the "1" in the column register 164 reaches the rightmost shift cell 167, the line is complete.

Shortly thereafter, a first pulse $P_x$ from the row clock 158 arrives at the row register 154. In response to the clock pulse $P_x$, the ninth shift cell 172 becomes a "0" and the tenth shift cell 172* becomes a "1." The ninth row driver 174 is deactivated and the row N line 142 is thus deactivated. Meanwhile, the column initialization circuit 165 (FIG. 1) returns the "1" from the rightmost shift cell 167 of the column register 164 to the leftmost shift cell 167.

The output of the tenth shift cell 172* is unconnected and does not activate any row driver 174. Because no row driver 174 is activated, no select transistor is "ON" and no drive transistor is coupled to a column line. All image samples from the column line driver 166 are blocked by select transistors and do not drive any of the emitter sets. Consequently, from the first clock pulse $P_x$ until the second clock pulse $p_y$, no emitter sets are activated, even though each of the column lines receives a sample of the image signal.

At the second clock pulse $p_y$, the output of the tenth shift cell 172* becomes a "0," and the eleventh shift cell 172 outputs a "1." Because the eleventh shift cell 172 is connected to the next available row driver 174 (the tenth row driver) the row N+1 line 144 (FIG. 2) is activated. The select transistors 138, 140 in the row N+1 line 144 then couple their respective drive transistors 130, 132 to the corresponding column lines. The dot clock 162 (FIG. 1) then activates the column driver bank 152 to sequentially drive the column lines 146, 148 (FIG. 2) in the row N+1 line 142 (FIG. 2). As the image samples arrive at the column lines 146, 148, they drive the emitter sets 108, 110 to produce another image line.

As can be seen from the above discussion, the unconnected shift cells 172* cause every tenth line of the image to be eliminated. The number of rows of the array 102 is also reduced accordingly, allowing the vertical dimension of the array 102 to be reduced. For example, where an image signal is directed to a screen having 240 lines, elimination of every tenth line would reduce the overall number of lines by 24. An array having 216 rows would be sufficient to display the image. The height of the display is thus reduced by about 10%. Because the eliminated rows are spaced apart among the remaining rows, the image is not chopped.

Figure 5:
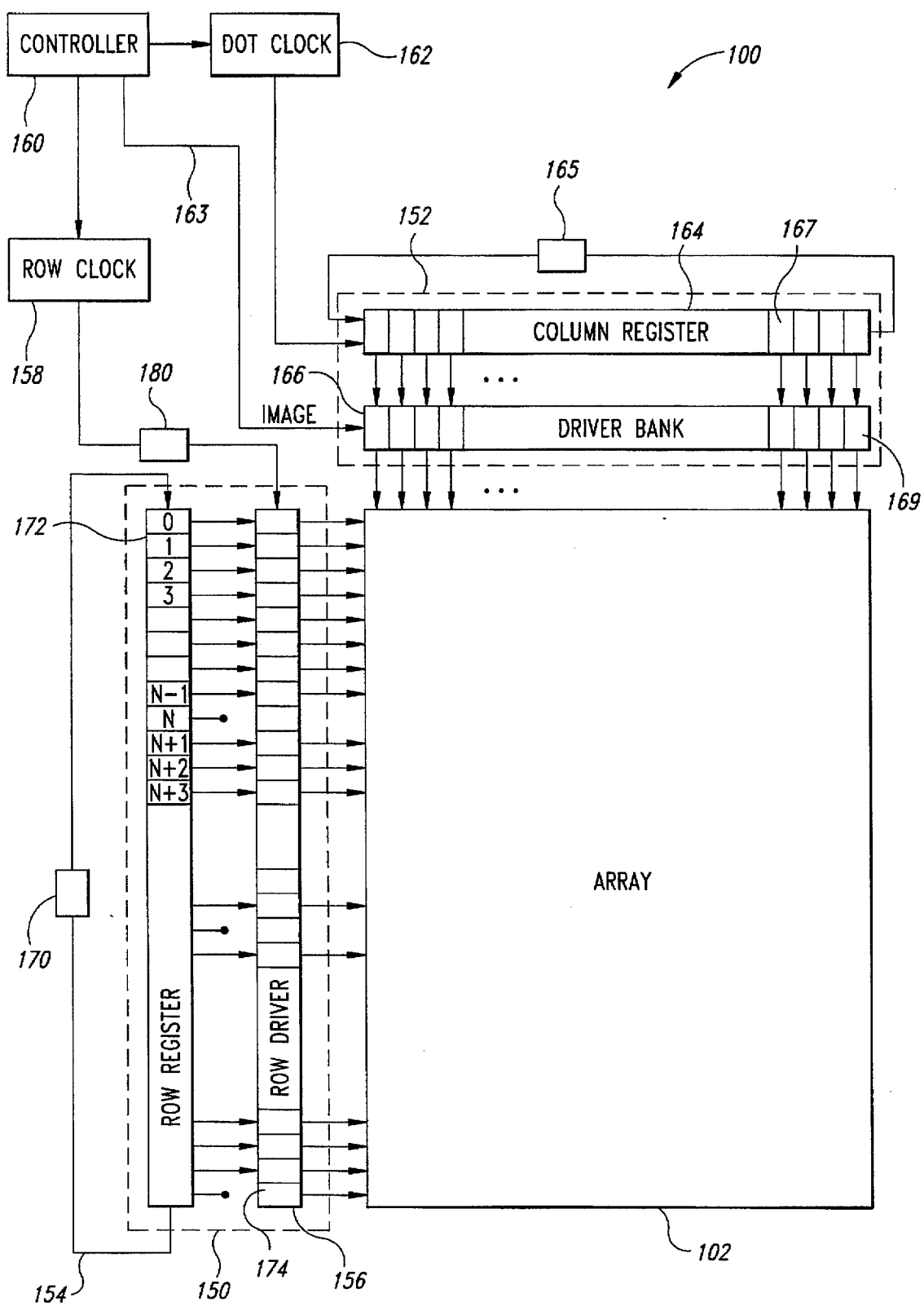
FIG. 5 is a block digram of an alternative embodiment of a field emission display including a clock dropping circuit.

While the above embodiment utilizes disconnected shift cells 172* to eliminate rows, an alternative embodiment shown in FIG. 5, eliminates every nth pulse of the row clock. In this embodiment, a clock dropping circuit 180 is connected between the row clock 158 and the row pointer 150 such that the row pointer 150 receives a revised clock signal. The clock dropping circuit 180 is any suitable known circuit for eliminating selected clock pulses. The revised clock signal output from the clock dropping circuit 180 is equal to the row clock signal, except that every nth pulse is eliminated. As a result, after the nth−1 pulse of the row clock signal, the nth pulse does not reach the row register 154. Consequently, the "1" in the row register 154 is not walked to the next shift cell 172 until the nth+1 pulse of the row clock signal. Instead, the "1" remains in the current shift cell 172 as the "1" in the column register 164 passes twice through all of the shift cells 167 the column register.

The first time the "1" walks through the column register 164, the column drivers 169 drive each of the emitter sets in the activated row with image samples to produce a line of image. As the "1" walks through the column register 164 a second time, the same emitter sets are re-activated by a subsequent set of line samples to "overwrite" the original line of image. Because every nth line of image overwrites the immediately preceding line of image, every nth line of the array 102 can be eliminated, thereby reducing the size of the array. Also, in this approach, the dummy shift cells 172* can be eliminated, reducing the size of the row register 154.

While the invention has been described by way of exemplary embodiments, various structures may be within the scope of the invention. For example, every shift cell 172 of the row register 154 can be coupled to a row driver 174 while the output of every nth row driver 174 is left open. The nth drivers 174 would thus be activated, but, would drive no rows. Every nth row of the array 102 can then be eliminated.

Similarly, in some applications, it may also be desirable to eliminate selected columns to reduce the width of the display and maintain a desired aspect ratio of an image. In such applications, image samples can be eliminated with the same techniques of leaving open outputs of the column register 164 or outputs of the column drivers 152.

Moreover, equivalent structure may be substituted for the structures described herein to perform the same function in substantially the same way and fall within the scope of the present invention. The invention is therefore described by the claims appended hereto and is not restricted to the embodiments shown herein.

I claim:

1. A synchronously driven field emission display for displaying information in response to a driving signal and a clock signal, comprising:

an array of emitter sets arranged in rows and columns, each emitter set including at least one emitter, each emitter set being activated by synchronous column and row signals;

a column driver circuit having a drying input connected to receive the driving signal, the column driver circuit further including a plurality of column outputs for providing column signals in response to the driving signal, each column output being coupled to one of the columns of emitter sets;

a row circuit having a plurality of row drivers, each coupled to a respective one of the rows of pixels, each row circuit being activatable by a row select signal; and a row selector circuit, the row selector circuit having a clock input for receiving the clock signal, the row selector circuit having a plurality of active row outputs and a plurality of open row outputs for producing the row select signals, each active row output being coupled to activate a respective one of the row drivers, each open row output being electrically isolated from the row drivers, the row selector circuit being configured to selectively activate each successive active or open row output in sequence in response to the clock signal, the open row outputs being spaced apart among the active row outputs.

2. The field emission display of claim 1 wherein the row selector circuit is a shift register having a plurality of shift cells.

3. The field emission display of claim 2, further including an initialization circuit coupled to establish a predetermined condition of the shift register.

4. The field emission display of claim 2, further including:

a plurality of column lines, each column line being coupled between one of the column outputs and the corresponding column of pixels; and a plurality of switches electrically connected between respective ones of the pixels and the corresponding column line, each switch having a select input coupled to one of the active row outputs, such that in response to activation of each active row output a corresponding one of the switches connects the corresponding column line to the pixel.

5. The field emission display of claim 4 wherein the array is integrated into a substrate and each switch is a transistor integrated into the substrate.

6. A synchronously driven matrix addressable display for displaying information in response to a driving signal and a clock signal having a plurality of pulses, comprising:

an array of pixels arranged in rows and columns, each pixel being activated by concurrent column and row signals;

a column driver circuit having a driving input connected to receive the driving signal, the column driver circuit further including a plurality of column outputs for providing column signals in response to the driving signal, each column output being coupled to one of the columns of pixels;

a pulse dropping circuit coupled to receive the clock signal, the pulse dropping circuit dropping selected clock pulses spaced apart among the pulses of the clock signal to produce a revised clock signal in response to the clock signal; and a line selector circuit, the line selector circuit having a clock input for receiving the revised clock signal and a plurality of active row outputs for producing row signals, each active row being coupled to a respective one of the rows of pixels, the line selector circuit configured to selectively activate each successive active output in sequence in response to each pulse of the revised clock signal.

7. The display of claim 1 wherein the line selector circuit includes:

a shift register having a plurality of shift cells; and an initialization circuit coupled to initialize the shift register.

8. The display of claim 6 wherein the column driver circuit further includes a plurality of open outputs spaced and interleaved among the column outputs.

9. A method of reducing a video image in a matrix addressable display having an array of pixels arranged in rows and columns, the video image being represented by an image signal, comprising the steps of:

segmenting the video image into a plurality of sequenced image lines, the number of image lines being greater than the number of rows of pixels;

identifying a set of undesired image lines including at least three undesired image lines, the undesired image lines being spaced apart among the image lines;

discarding the undesired image lines to produce a compressed set of desired image lines; and displaying each image line in the compressed set of desired image lines with a respective one of the rows of pixels to produce a reduced image consisting only of desired image lines.

10. The method of claim 9 wherein for each desired image line, the step of displaying the desired image line includes the steps of:

sampling the image signal to produce a set of image samples corresponding to the desired image line;

activating the respective row of pixels; and after activating the row of pixels, sequentially providing the image samples to the columns in the activated row.

11. The method of claim 10 wherein the step of sampling the image signal includes the steps of:

producing a sampling clock; and producing the image sample at a respective pulse of the sampling clock.

12. The method of claim 11 wherein the step of activating the respective row of pixels includes the steps of:

producing a row clock signal synchronized to the sampling clock signal;

producing a sequence of row activation signals in response to the row clock signal; and sequentially applying the row activation signals to successive ones of the rows of pixels in response to the row clock signal.

13. A method of producing an image in a matrix addressable display having an array of pixels arranged in rows and columns, the image being represented by an image signal, each pixel emitting light only if its corresponding row and column of pixels are activated, comprising the steps of:

producing a column dock signal;

producing a row dock signal synchronized to the column dock signal;

sampling the image signal according to the column clock signal to produce a plurality of image samples;

sequentially providing the image samples to the columns of pixels according to the column clock;

identifying a set of image rows, each image row corresponding to a segment of the image, wherein the number of image rows is greater than the number of rows of pixels;

selecting a spaced apart set of undesired rows from the set of image rows, the number of undesired rows being equal to the difference between the number of image rows and the number of rows of pixels, such that one row of pixels corresponds to each of the rows that is not an undesired row, the undesired rows and rows that are not undesired rows being interleaved and the number of undesired rows being at least three; and sequentially activating only the rows of pixels corresponding to the image rows that are not undesired rows to produce an image consisting only of segments of the image that are not undesired rows.

14. The method of claim 13 wherein the step of sequentially activating only the rows of pixels corresponding to the image rows includes:

initializing a row shift register coupled to the rows of pixels; and clocking data through the shift register to sequentially activate outputs of the shift register.

15. The method of claim 14 wherein the step of sequentially activating only the rows of pixels corresponding to the image rows includes taming on a select transistor to couple the image signal to the pixels in the row of pixels.

* * * * *

UNITED STATES PATENT AND TRADEMARK OFFICE
CERTIFICATE OF CORRECTION

PATENT NO. : 5,663,742
DATED : September 2, 1997
INVENTOR(S) : Hush

It is certified that error appears in the above-identified patent and that said Letters Patent is hereby corrected as shown below:

Column 7,
Line 53, reads "drying" should read -- driving --
Line 63, reads "dock" should read -- clock --

Column 8,
Line 40, reads "dock" should read -- clock --
Line 44, reads "dock" should read -- clock --
Line 52, reads "dock" should read -- clock --
Line 59, reads "spaced" should read -- spaced apart --

Column 10,
Line 1, reads "dock" should read -- clock --
Line 2, reads "dock" should read -- clock --
Line 3, reads "dock" should read -- clock --
Line 35, reads "taming" should read -- turning --

Signed and Sealed this

Seventh Day of August, 2001

*Attest:*

*Attesting Officer*

NICHOLAS P. GODICI
*Acting Director of the United States Patent and Trademark Office*